United States Patent
Shiraishi et al.

(10) Patent No.: US 10,305,299 B2
(45) Date of Patent: May 28, 2019

(54) BATTERY APPARATUS, VEHICLE, BATTERY MANAGEMENT PROGRAM, AND MANAGEMENT METHOD OF BATTERY APPARATUS

(71) Applicant: GS Yuasa International Ltd., Kyoto-shi (JP)

(72) Inventors: Takeyuki Shiraishi, Kyoto (JP); Masashi Nakamura, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 121 days.

(21) Appl. No.: 15/415,997

(22) Filed: Jan. 26, 2017

(65) Prior Publication Data
US 2017/0214257 A1 Jul. 27, 2017

(30) Foreign Application Priority Data
Jan. 27, 2016 (JP) .................... 2016-013267

(51) Int. Cl.
*H02J 7/00* (2006.01)
*B60L 58/12* (2019.01)

(52) U.S. Cl.
CPC ............ *H02J 7/0029* (2013.01); *B60L 58/12* (2019.02); *H02J 7/007* (2013.01); *H02J 2007/004* (2013.01); *H02J 2007/0037* (2013.01)

(58) Field of Classification Search
USPC ................. 320/107, 108, 109, 128
See application file for complete search history.

(56) References Cited

U.S. PATENT DOCUMENTS

| | | | |
|---|---|---|---|
| 5,343,137 A | 8/1994 | Kitaoka et al. | |
| 9,696,736 B2* | 7/2017 | Mikolajczak | G05F 1/565 |
| 2006/0091858 A1* | 5/2006 | Johnson | B25F 5/00 |
| | | | 320/128 |
| 2013/0229186 A1 | 9/2013 | Shiraishi et al. | |
| 2013/0320986 A1 | 12/2013 | Shiraishi et al. | |
| 2014/0009106 A1* | 1/2014 | Andrea | H02H 9/002 |
| | | | 320/107 |

(Continued)

FOREIGN PATENT DOCUMENTS

| | | |
|---|---|---|
| EP | 2 439 810 A2 | 4/2012 |
| JP | S 55-136149 U | 3/1980 |

(Continued)

*Primary Examiner* — Brian Ngo
(74) *Attorney, Agent, or Firm* — McGinn IP Law Group, PLLC

(57) ABSTRACT

A battery apparatus disclosed in the present specification includes: an energy storage device that supplies power to a vehicle load mounted on a vehicle; a current interrupt unit that causes the energy storage device and the vehicle load to be in a conduction state or in an interruption state; a parallel circuit connected in parallel with the current interrupt device and including a diode that causes a voltage drop when current flows therethrough; and a control unit, wherein a CPU in the control unit executes an interruption process for switching the current interrupt device to an interruption state to detect a voltage between both ends of the current interrupt device, when a high load that is to be activated by supply of power exceeding maximum allowable current of the diode is not activated.

19 Claims, 12 Drawing Sheets

(56) References Cited

U.S. PATENT DOCUMENTS

| | | | | |
|---|---|---|---|---|
| 2014/0062438 A1* | 3/2014 | Nakamura | ............... | G05F 1/46 |
| | | | | 323/282 |
| 2014/0132002 A1* | 5/2014 | Watanabe | ........... | F02N 11/0866 |
| | | | | 290/31 |
| 2015/0316617 A1 | 11/2015 | Shiraishi et al. | | |
| 2016/0084908 A1 | 3/2016 | Shiraishi et al. | | |
| 2016/0282415 A1 | 9/2016 | Shiraishi et al. | | |
| 2017/0214257 A1* | 7/2017 | Shiraishi | ............... | H02J 7/007 |

FOREIGN PATENT DOCUMENTS

| | | |
|---|---|---|
| JP | S 58-083746 U | 6/1983 |
| JP | H 05-205781 A | 8/1993 |
| JP | 2008-162342 A | 7/2008 |
| JP | 2011-010483 A | 1/2011 |
| JP | 2012-079547 A | 4/2012 |
| JP | 2012-085382 A | 4/2012 |
| JP | 2013-181822 A | 9/2013 |
| JP | 2014-036556 A | 2/2014 |
| JP | 2015-008600 A | 1/2015 |

\* cited by examiner

BATTERY APPARATUS, VEHICLE, BATTERY MANAGEMENT PROGRAM, AND MANAGEMENT METHOD OF BATTERY APPARATUS

CROSS-REFERENCE TO RELATED APPLICATIONS

This application claims the benefit of Japanese patent application No. 2016-013267, filed on Jan. 27, 2016, which is incorporated by reference.

FIELD

The technology disclosed in the present specification relates to a battery apparatus, a vehicle, a battery management program, and a management method of a battery apparatus.

BACKGROUND

A battery unit disclosed in JP 05-205781 A has been known as a battery unit that is mounted on a vehicle and provided with a switching means. This battery unit opens the switching means to disconnect a vehicle load from a battery to prevent overdischarge of the battery, when a voltage drop of the battery continues for a certain period of time in accordance with the increase in the vehicle load.

Such a battery unit generally includes a vehicle power generator, which is connected in parallel with the load, for charging the battery. By opening the switching means, the battery is prevented from being in an overcharge state.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

If the switching means is in failure in the battery unit described above, an occurrence of an abnormal state such as overdischarge or overcharge of the battery cannot be prevented. In view of this, the failure of the switching means needs to be detected. It has been studied that a voltage drop element is connected in parallel with the switching means, and a voltage drop by the voltage drop element is detected while current is interrupted by a current interrupt device, to diagnose failure of the current interrupt device.

If large current exceeding the maximum allowable current of the voltage drop element flows through the voltage drop element during the current interruption by the current interrupt device, the voltage drop element may be broken. If a voltage drop element having larger maximum allowable current is used, the space for mounting the voltage drop element is increased and production cost is also increased.

The present specification discloses a technology to prevent a voltage drop element from being broken due to large current without using a voltage drop element having large maximum allowable current.

A battery apparatus (energy storage apparatus) disclosed in the present specification is configured to include: an energy storage device that supplies power to a load; a current interrupt unit that causes the energy storage device and the load to be in a conduction state or in an interruption state; a parallel circuit connected in parallel with the current interrupt unit and including a voltage drop element that causes a voltage drop when current flows therethrough; and a control unit, wherein the control unit executes an interruption process for switching the current interrupt unit to an interruption state, when a high load that is to be activated by supply of power exceeding maximum allowable current of the voltage drop element is not activated.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
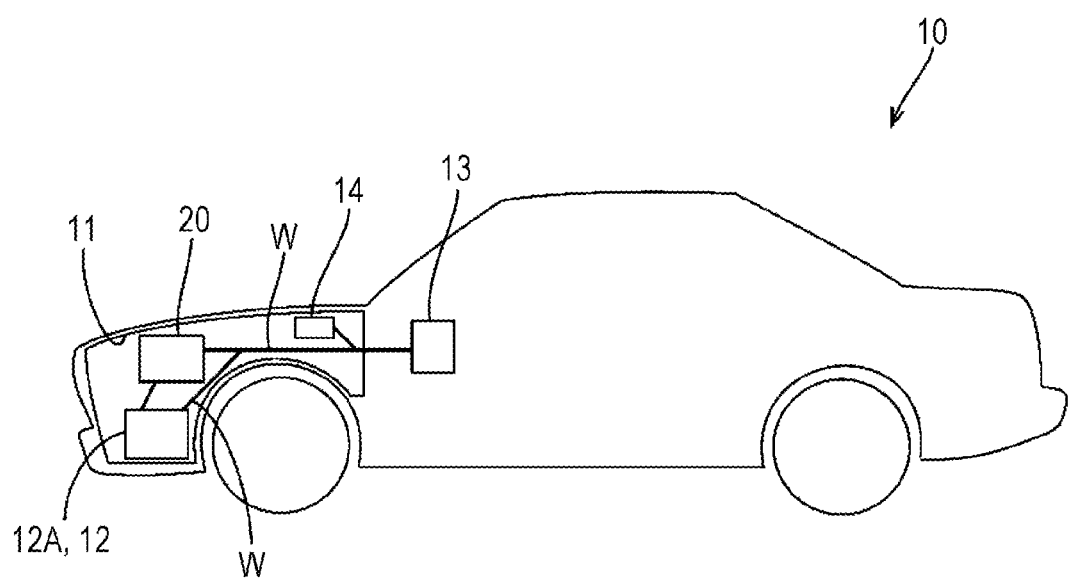
FIG. 1 is a diagram illustrating a vehicle according to a first embodiment.

The technology disclosed in the present specification is configured to include: a secondary battery that supplies power to a load; a current interrupt unit that causes the secondary battery and the load to be in a conduction state or in an interruption state; a parallel circuit connected in parallel with the current interrupt unit and including a voltage drop element that causes a voltage drop when current flows therethrough; and a control unit, wherein the control unit executes an interruption process for switching the current interrupt unit to an interruption state, when a high load that is to be activated by supply of power exceeding maximum allowable current of the voltage drop element is not activated.

The technology disclosed in the present specification can prevent a voltage drop element from being broken due to large current without using a voltage drop element having large maximum allowable current.

Outline of Present Embodiment

Firstly, the outline of a battery apparatus, a battery management program, and a management method of a battery apparatus disclosed in the present embodiment will be described.

A battery apparatus disclosed in the present embodiment is configured to include: a secondary battery that supplies power to a load; a current interrupt unit that causes the secondary battery and the load to be in a conduction state or in an interruption state; a parallel circuit connected in parallel with the current interrupt unit and including a voltage drop element that causes a voltage drop when current flows therethrough; and a control unit, wherein the control unit executes an interruption process for switching the current interrupt unit to an interruption state, when a high load that is to be activated by supply of power exceeding maximum allowable current of the voltage drop element is not activated.

A vehicle disclosed in the present embodiment is configured to include the battery apparatus, the load, and a load system that controls the operation of the load.

A vehicle disclosed in the present embodiment is configured to include the battery apparatus, the load, and a load system, wherein the load system inhibits the high load from being activated when receiving the inhibition instruction.

A battery management program disclosed in the present embodiment causes a control unit in a battery apparatus, which includes: a secondary battery that supplies power to a load; a current interrupt unit that causes the secondary battery and the load to be in a conduction state or in an interruption state; and a parallel circuit connected in parallel with the current interrupt unit and including a voltage drop element that causes a voltage drop when current flows therethrough, to execute an interruption process for switching the current interrupt unit to an interruption state, when a high load that is to be activated by supply of power exceeding maximum allowable current of the voltage drop element is not activated.

A management method of a battery apparatus disclosed in the present embodiment is a management method of a battery apparatus including: a secondary battery that supplies power to a load; a current interrupt device that causes the secondary battery and the load to be in a conduction state or in an interruption state; and a parallel circuit connected in parallel with the current interrupt device and including a voltage drop element that causes a voltage drop when current flows therethrough, the method including executing an interruption process for switching the current interrupt device to an interruption state, when a high load that is to be activated by supply of power exceeding maximum allowable current of the voltage drop element is not activated.

According to the battery apparatus, the battery management program, and the management method of a battery apparatus described above, the current interrupt unit is in an interruption state by the interruption process when the high load is not activated. In other words, when the current interrupt unit is in the interruption state, the high load is not activated, which can prevent current exceeding the maximum allowable current of the voltage drop element from flowing through the voltage drop element. Thus, the voltage drop element can be prevented from being broken due to large current, without using a voltage drop element having large maximum allowable current.

The battery apparatus and the vehicle disclosed in the present specification may be configured as described below.

The battery apparatus may include a voltage detection unit that detects a voltage between both ends of the current interrupt unit, wherein the control unit executes: a first voltage detection process for detecting a voltage by switching the current interrupt unit to a conduction state; a second voltage detection process for detecting a voltage by executing the interruption process; and a failure diagnosis process for diagnosing whether or not the current interrupt unit is in failure on the basis of the voltage in the first voltage detection process and the voltage in the second voltage detection process.

The battery apparatus thus configured can determine whether or not the current interrupt unit is in failure on the basis of the voltage in the first voltage detection process and the voltage in the second voltage detection process, while preventing the load and the secondary batteries from being in an interruption state by the parallel circuit, when the current interrupt unit is in the interruption state in the second voltage detection process for the failure diagnosis.

Accordingly, the battery apparatus thus configured can prevent the voltage drop element, which facilitates the failure diagnosis by causing a voltage difference on the current interrupt unit between the conduction state and the interruption state, from being broken due to large current, while preventing the voltage drop element from being large-sized.

The failure diagnosis process may be executed in a shorter time than a starting time for starting the high load.

According to this configuration, the failure diagnosis process can be executed in about several hundred milliseconds shorter than the starting time for starting the high load such as a starter motor. Thus, the failure diagnosis process can be executed without providing a feeling of strangeness upon the startup of the high load.

A battery charger for charging the secondary battery may be connected to the secondary battery through the current interrupt unit, and the voltage drop element may be a diode that allows current to flow from the secondary battery to the load.

According to this configuration, when the current interrupt unit is in the interruption state, a voltage drop value becomes constant, whereby the state of the current interrupt unit can easily be determined as compared to a configuration in which a voltage drop is variable. In addition, only discharge from the secondary battery to the load can be allowed while in the interruption state of the current interrupt unit, which can prevent the secondary battery from being charged and reaching an overcharge state.

The parallel circuit may include an auxiliary current interrupt unit that is connected in series with the voltage drop element and is switched to a conduction state and an interruption state.

According to this configuration, discharge can be cut off by the auxiliary current interrupt unit before the secondary battery reaches an overdischarge state, whereby the secondary battery can be prevented from reaching the overdischarge state.

The control unit may issue an inhibition instruction for inhibiting the high load from being activated during the interruption process to a load system that controls an operation of the load, before executing the interruption process.

According to this configuration, the inhibition instruction is issued from the battery apparatus to the load system so that the interruption process can be executed with the state in which activating the high load is inhibited, whereby the flow of current exceeding the maximum allowable current of the voltage drop element through the voltage drop element can be prevented. Thus, breakdown of the voltage drop element can be prevented.

The control unit may execute the interruption process in response to an input of an interruption permission instruction for the current interrupt unit which is output after a load system controlling an operation of the load inhibits the operation of the high load.

According to this configuration, the control unit executes the interruption process according to the interruption permission instruction which is output in response to the inhibition of the operation of the high load by the load system, whereby the flow of current exceeding the maximum allowable current of the voltage drop element through the voltage drop element can be prevented. Thus, breakdown of the voltage drop element can be prevented.

The control unit may execute the interruption process in response to an input of an interruption permission instruction which is output after the load system inhibits the operation of the high load by the inhibition instruction.

According to this configuration, the load system inhibits the operation of the high load by the inhibition instruction from the control unit, and the control unit switches the current interrupt device to an interruption state on the basis of the interruption permission instruction which is output thereafter, whereby breakdown of the voltage drop element due to large current can be prevented.

First Embodiment

The first embodiment in which the technology disclosed in the present specification is applied to a vehicle 10 such as an automobile will be described with reference to FIGS. 1 to 8.

As illustrated in FIG. 1, the vehicle 10 includes: a vehicle load (one example of a "load") 12, such as a starter motor for starting an engine or electric components, installed in an engine room 11; a battery apparatus 20 connected to the vehicle load 12; a vehicle power generator (one example of a "battery charger") 14, such as an alternator, connected to the vehicle load 12 and the battery apparatus 20; and a vehicle-side electronic control unit (hereinafter referred to as "vehicle ECU") 13 that controls the operation of the vehicle load 12. The vehicle-side electronic control unit is one example of a load system.

The vehicle load 12 is activated by power supply from the battery apparatus 20 and the vehicle power generator 14. When the supply amount of power from the vehicle power generator 14 is small, the vehicle load 12 is activated by receiving power supply from the battery apparatus 20.

The vehicle power generator 14 rotates with the drive of the engine in the vehicle 10 to generate power, and supplies the generated power to the vehicle load 12 and the battery apparatus 20.

The vehicle ECU 13 is communicably connected to the vehicle load 12, the vehicle power generator 14, the battery apparatus 20, and the like through communication lines W so as to control the operation of the engine and the vehicle load 12 on the basis of the state of the vehicle 10 or the state of the battery apparatus 20. Note that FIG. 1 does not illustrate all of the communication lines W for easy understanding of the drawing. LIN communication can be used as the communication system between the vehicle ECU 13 and the battery apparatus 20, for example.

Figure 2:
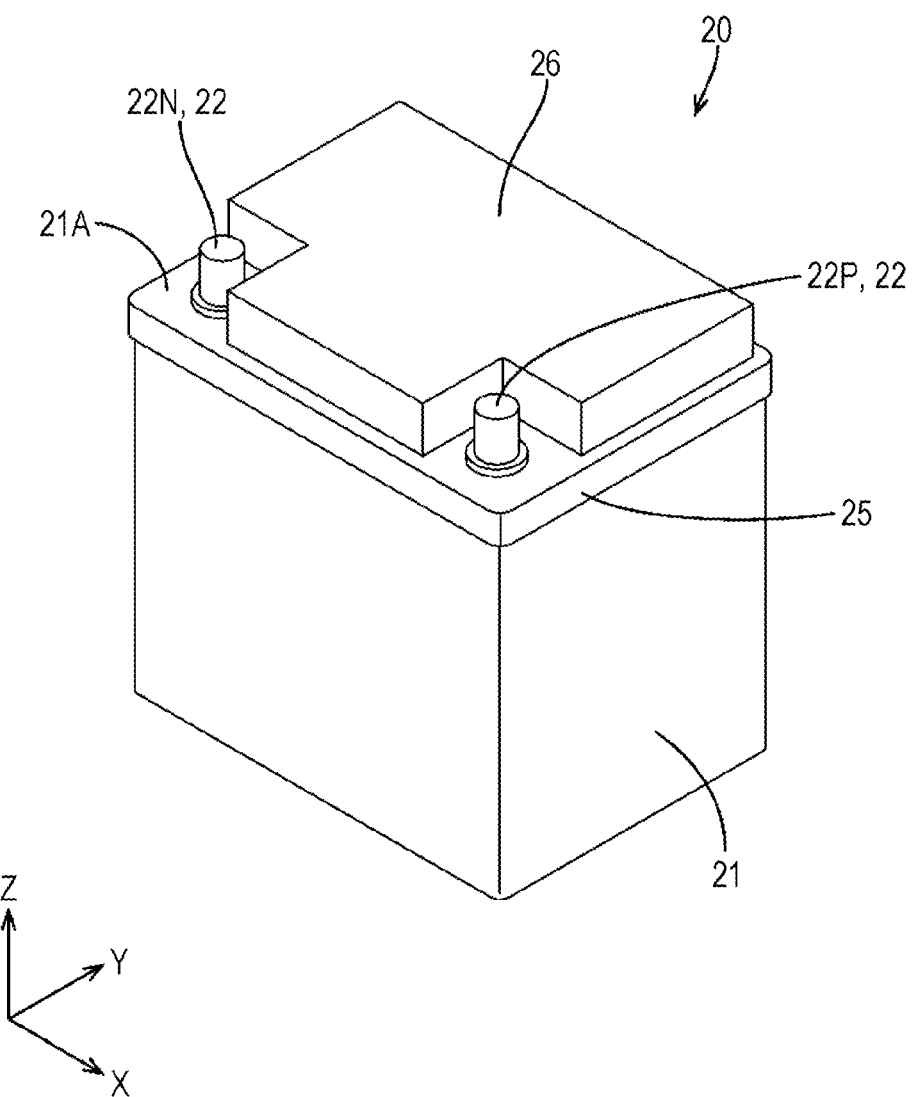
FIG. 2 is a perspective view of a battery apparatus.
Figure 3:
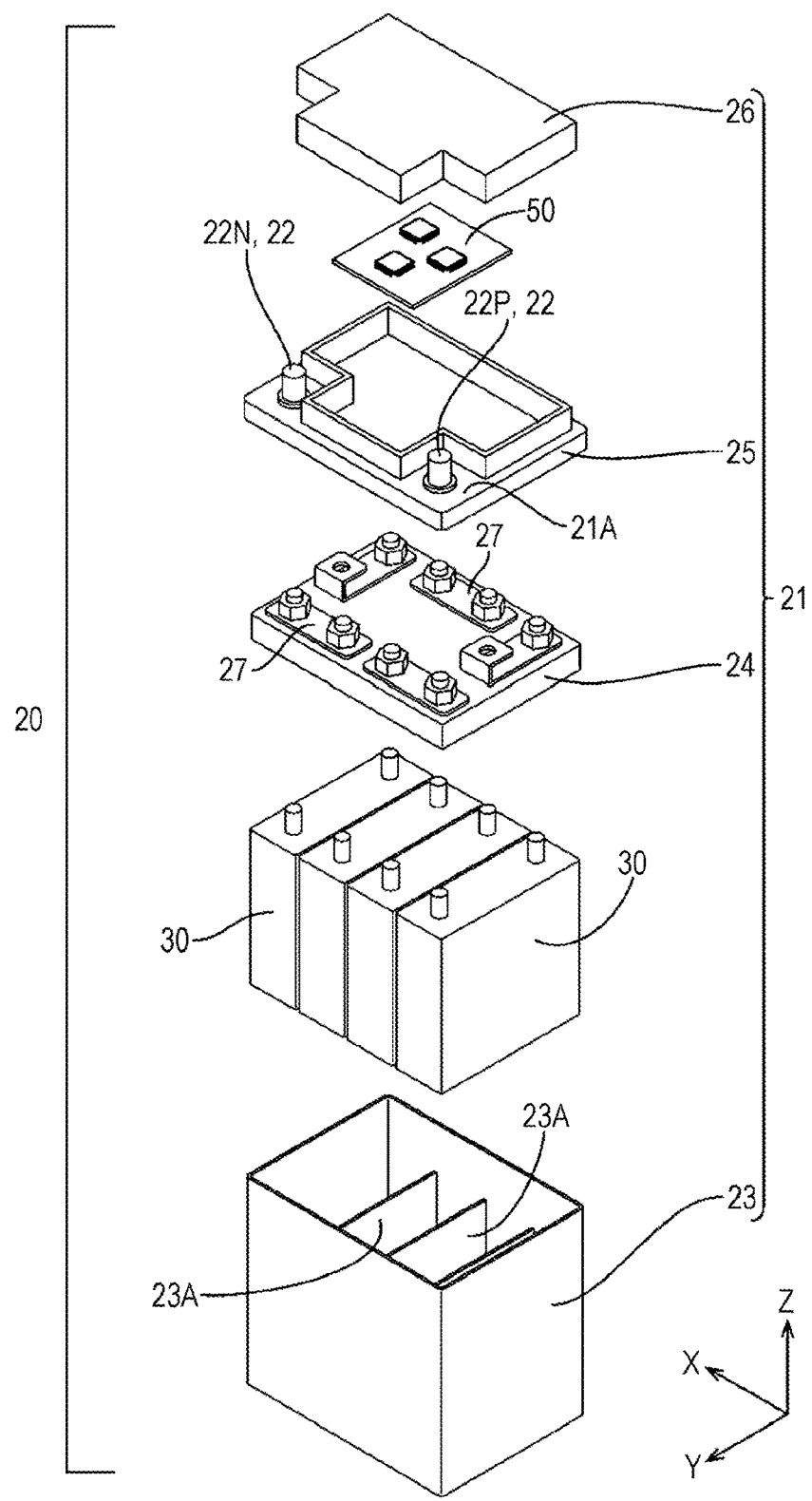
FIG. 3 is an exploded perspective view of the battery apparatus.
Figure 4:
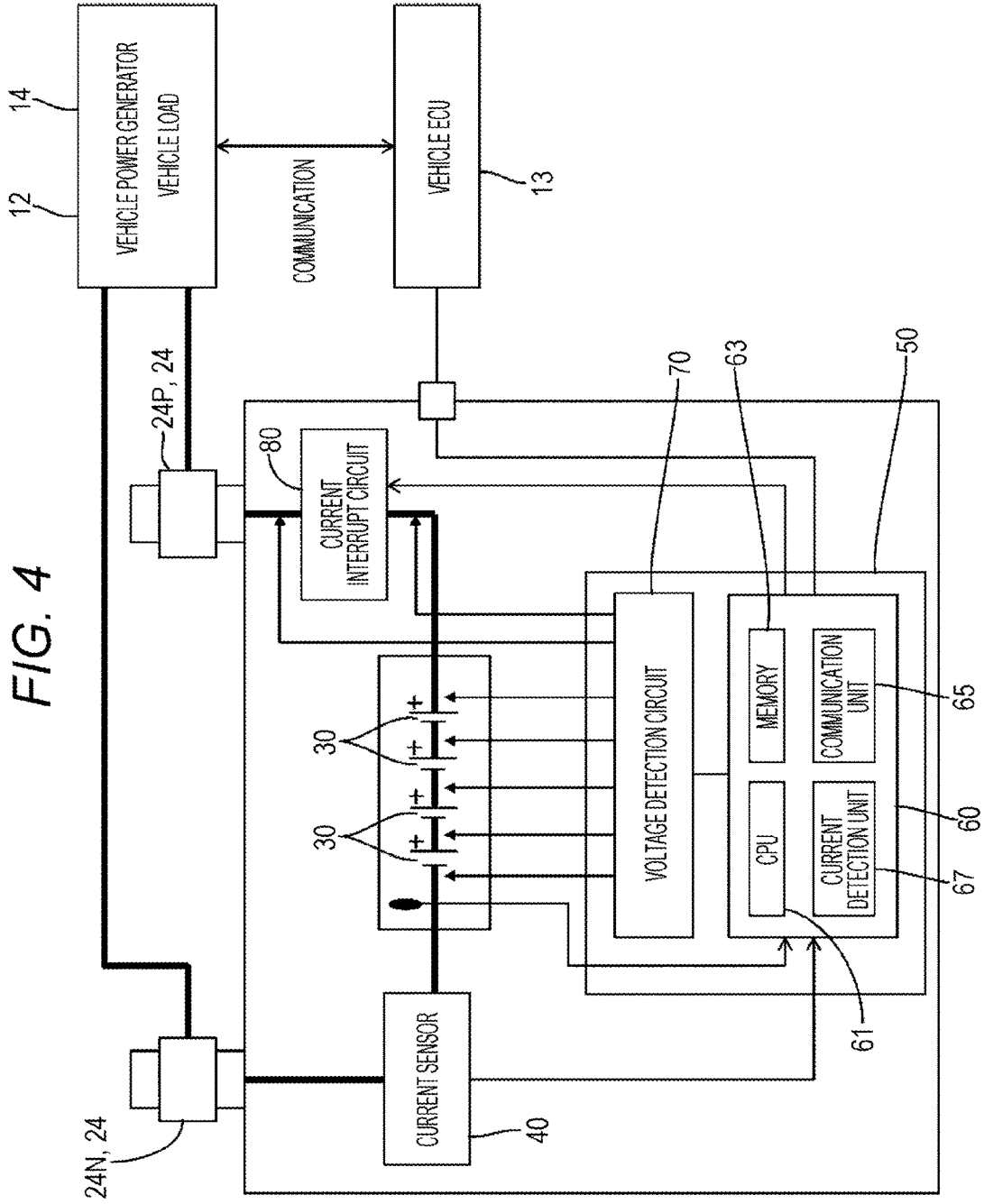
FIG. 4 is a block diagram of the battery apparatus.

As illustrated in FIG. 2, the battery apparatus 20 has a block-shaped battery case 21. As illustrated in FIGS. 3 and 4, a plurality of secondary batteries (energy storage devices) 30 which is connected in series, a battery management unit (hereinafter referred to as "BMU") 50 that manages the secondary batteries 30, a current sensor 40 that detects current flowing through the secondary batteries 30, a current interrupt circuit 80, and the like are stored in the battery case 21.

In FIG. 3, the current sensor 40 and the current interrupt circuit 80 are not illustrated and the internal structure is simplified for easy understanding of the structure of the battery case 21. When FIGS. 2 and 3 are referred to, the up-down direction of the battery case 21 is defined as a Z direction, the direction along the long side of the battery case 21 is defined as an X direction, and the direction along the depth of the battery case 21 is defined as a Y direction, in the state in which the battery case 21 is placed without having any tilt with respect to the installment plane.

The battery case 21 is made of a synthetic resin, and an upper wall 21A of the battery case 21 has substantially a rectangular shape in a plan view with a height difference in the Y direction as illustrated in FIGS. 2 and 3. A pair of terminal portions 22 to which unillustrated harness terminals are connected is provided on both ends of a lower part of the upper wall 21A in the X direction so as to be embedded into the upper wall 21A. The pair of terminal portions 22 is made of a metal such as a lead alloy, for example, and one of the pair of terminal portions 22 is a positive-electrode terminal 22P, and the other is a negative-electrode terminal 22N.

As illustrated in FIG. 3, the battery case 21 includes a box-shaped case body 23 open at the top, a positioning member 24 for positioning the secondary batteries 30, an inner lid 25 attached to the top of the case body 23, and an upper lid 26 attached to the top of the inner lid 25.

As illustrated in FIG. 3, a plurality of cell chambers 23A for individually storing the secondary batteries 30 are arranged in the X direction in the case body 23.

As illustrated in FIG. 3, the positioning member 24 includes a plurality of bus bars 27 disposed on the upper surface thereof. Because of the positioning member 24 disposed above the secondary batteries 30 arranged in the case body 23, the secondary batteries 30 are positioned and connected in series by the bus bars 27.

As illustrated in FIG. 3, the inner lid 25 is able to store the BMU 50 inside, and when the inner lid 25 is mounted to the case body 23, the secondary batteries 30 and the BMU 50 are connected to each other.

The secondary batteries 30 are lithium ion batteries using negative active materials of graphite materials and positive active materials of iron phosphates such as LiFePO4, for example. As illustrated in FIG. 4, the serially-connected secondary batteries 30 are connected in series with the current sensor 40 and the current interrupt circuit 80 such that the current sensor 40 is located on the side of the negative electrode and the current interrupt circuit 80 is located on the side of the positive electrode with respect to the secondary batteries 30. Since the current sensor 40 is connected to the negative-electrode terminal 22N and the current interrupt circuit 80 is connected to the positive-electrode terminal 22P. Thus, the secondary batteries 30 connected in series are connected to the pair of terminal portions 22 through the current sensor 40 and the current interrupt circuit 80.

As illustrated in FIG. 4, the BMU 50 is configured to include a control unit 60 and a voltage detection circuit (one example of a "voltage detection unit") 70.

The voltage detection circuit 70 is connected to both ends of the current interrupt circuit 80 and both ends of each of the secondary batteries 30 through voltage detection lines. The voltage detection circuit 70 detects a voltage CV1 between both ends of the current interrupt circuit 80, a voltage of each of the secondary batteries 30, and a total voltage V of the secondary batteries 30 connected in series, in response to an instruction from the control unit 60.

The control unit 60 includes a central processing unit (hereinafter referred to as a "CPU") 61, a memory 63, a communication unit 65, and a current detection unit 67. The current detection unit 67 detects current flowing through the secondary batteries 30 through the current sensor 40.

The memory 63 stores various programs for controlling the operation of the BMU 50, and data necessary for the execution of various programs, such as individual and total overdischarge voltage thresholds of the secondary batteries 30 and individual and total overcharge voltage thresholds of the secondary batteries 30. The memory 63 also stores voltages and currents measured by the control unit 60 and the voltage detection circuit 70.

The communication unit 65 is connected to the vehicle ECU 13 so as to be communicable, thereby transmitting an instruction issued from the vehicle ECU 13 to the control unit 60 from the vehicle ECU 13, and transmitting an instruction issued from the CPU 61 in the control unit 60 to the vehicle ECU 13 from the control unit 60.

The CPU 61 controls the respective units in the battery apparatus 20 to protect the secondary batteries 30, on the basis of the voltage and current measured by the voltage detection circuit 70 and the current detection unit 67 and the various programs and data read from the memory 63.

Figure 5:
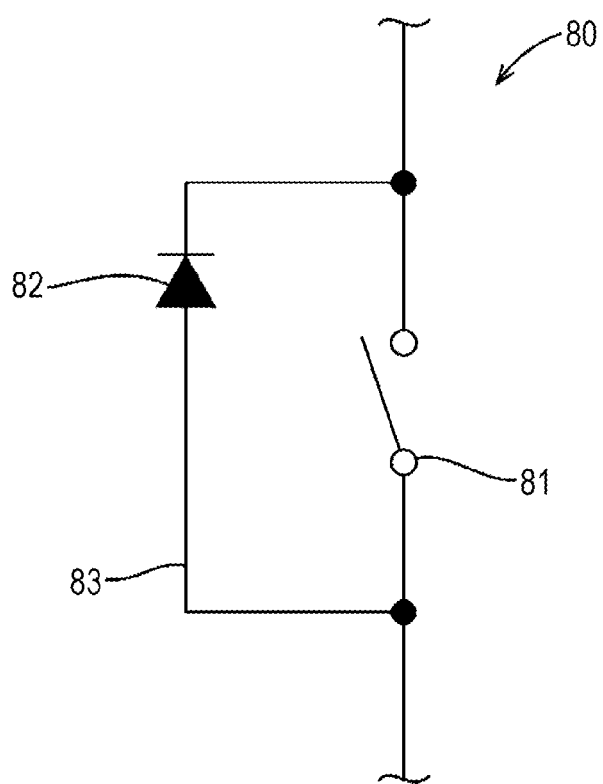
FIG. 5 is a diagram illustrating a current interrupt circuit.

As illustrated in FIG. 5, the current interrupt circuit 80 includes a current interrupt device 81 and a parallel circuit 83 connected in parallel with the current interrupt device 81.

The current interrupt device 81 is a contact relay (mechanical switch), for example, and is disposed between the secondary batteries 30 and the positive-electrode terminal 24P in such a way that one end thereof is connected to the secondary batteries 30 and the other end thereof is connected to the positive-electrode terminal 24P. The current interrupt device 81 is activated in response to the instruction from the CPU 61 in the BMU 50 so as to cause the secondary batteries 30 and the positive-electrode terminal 24P to be in a conduction state or in an interruption state. Although the current interrupt device 81 is a contact relay in the present embodiment, it may be a semiconductor switch such as an FET.

The parallel circuit 83 includes a diode (one example of a "voltage drop element") 82 which is disposed such that the direction of current flowing toward the positive-electrode terminal 24P from the secondary batteries 30, that is, toward the vehicle load 12 from the secondary batteries 30, is the forward direction. When the current interrupt device 81 is in the interruption state, current in the forward direction flows through the diode 82, whereby a voltage drop in forward voltage Vf occurs between both ends of the diode 82. The forward voltage Vf is substantially a fixed value, and is stored in the memory 63 in advance.

In order to protect the secondary batteries 30, the CPU 61 executes a battery protection process for switching the current interrupt device 81, a failure diagnosis process of the current interrupt device 81, and the like on the basis of the voltage and current measured by the voltage detection circuit 70 and the current detection unit 67 and various programs stored in the memory 63.

Figure 6:
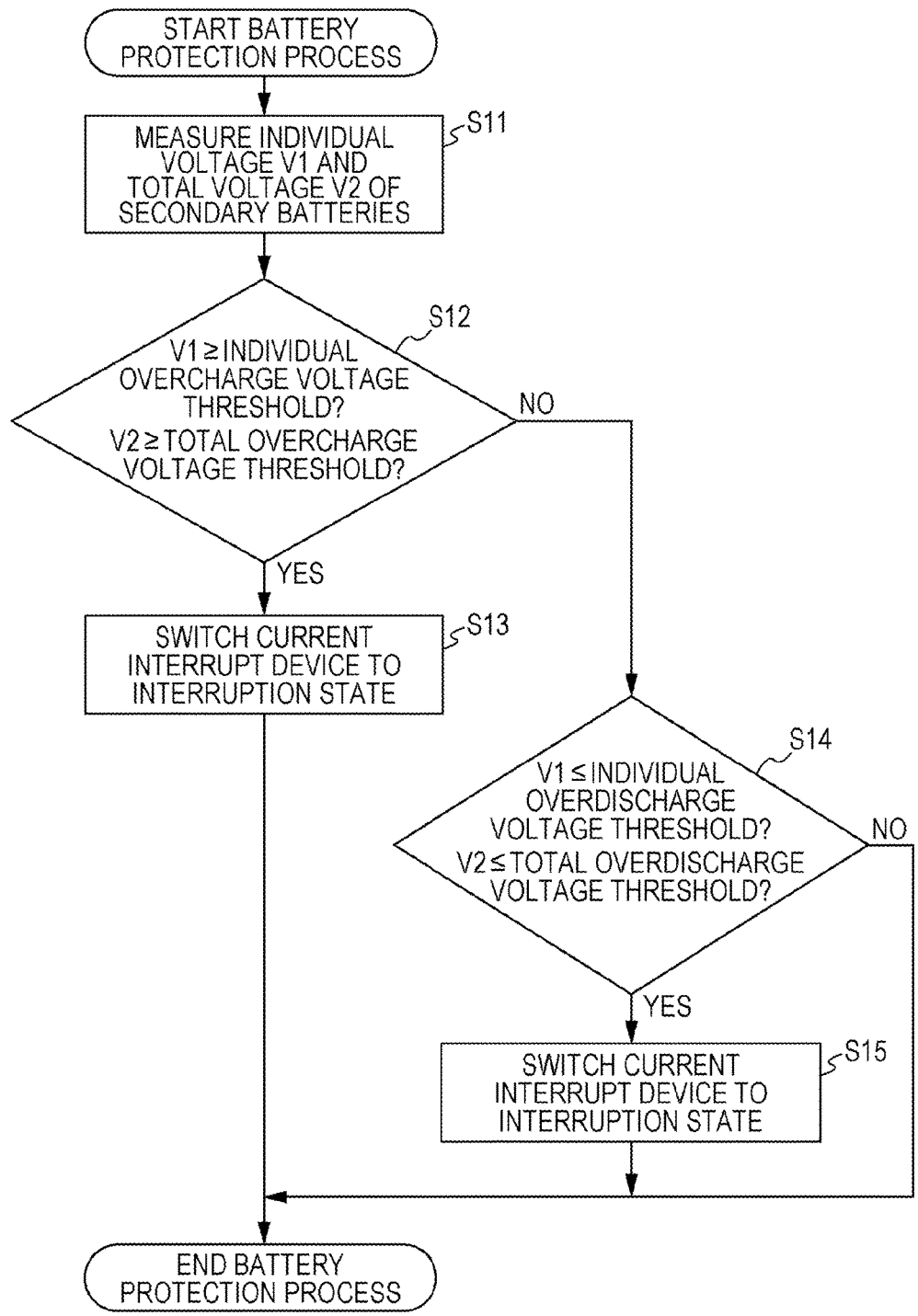
FIG. 6 is a flowchart of a battery protection process.

The battery protection process will be described below with reference to FIG. 6.

In the battery protection process, the CPU 61 detects an individual voltage V1 of each of the secondary batteries 30 and a total voltage V2 of the secondary batteries 30 connected in series by the voltage detection circuit 70 (S11), and compares the individual voltage V1 and the total voltage V2 to an individual overcharge voltage threshold and a total overcharge voltage threshold stored in the memory 63 (S12).

The individual overcharge voltage threshold assumes a value slightly smaller than the voltage value when one of the secondary batteries 30 is in an overcharge state, and the total overcharge voltage threshold assumes a value slightly smaller than the voltage value when the secondary batteries 30 connected in series are in the overcharge state.

When determining that the individual voltage V1 of any one of the secondary batteries 30 is equal to or larger than the individual overcharge voltage threshold, or that the total voltage V2 is equal to or larger than the total overcharge voltage threshold (S12: YES), the CPU 61 determines that the secondary batteries 30 are likely to reach the overcharge state, and transmits an interruption switching instruction for switching the current interrupt device 81 to an interruption state to the current interrupt device 81. According to this process, the current interrupt device 81 is switched to the interruption state (S13) to interrupt the current between the secondary batteries 30 and the vehicle power generator 14, which can prevent the secondary batteries 30 from reaching the overcharge state. Then, the battery protection process is ended.

On the other hand, when determining that all of the individual voltages V1 are smaller than the individual overcharge voltage threshold and the total voltage V2 is smaller than the total overcharge voltage threshold (S12: NO), the CPU 61 compares each individual voltage V1 and the total voltage V2 to the individual overdischarge voltage threshold and the total overdischarge voltage threshold stored in the memory 63 (S14). The individual overdischarge voltage threshold assumes a value slightly larger than the voltage value when one of the secondary batteries 30 is in an overdischarge state, and the total overdischarge voltage threshold assumes a value slightly larger than the voltage value when the secondary batteries 30 connected in series are in the overdischarge state.

When determining that the individual voltage V1 of any one of the secondary batteries 30 is smaller than the individual overcharge voltage threshold and the total voltage V2 is smaller than the total overcharge voltage threshold, as well as the individual voltage V1 of any one of the secondary batteries 30 is equal to or smaller than the individual overdischarge voltage threshold or the total voltage V2 is equal to or smaller than the total overdischarge voltage threshold (S12: NO and S14: YES), the CPU 61 determines that the secondary batteries 30 are likely to reach the overdischarge state, and transmits the interruption switching instruction to the current interrupt device 81. According to this process, the current interrupt device 81 is switched to the interruption state (S15) to interrupt the current between the secondary batteries 30 and the vehicle power generator 14, which can prevent the secondary batteries 30 from reaching the overdischarge state. Then, the battery protection process is ended.

On the other hand, when determining that all of the individual voltages V1 are smaller than the individual overcharge voltage threshold and the total voltage V2 is smaller than the total overcharge voltage threshold, as well as all of the individual voltages V1 are larger than the individual overdischarge voltage threshold and the total voltage V2 is larger than the total overdischarge voltage threshold (S12: NO and S14: NO), the CPU 61 ends the battery protection process.

In this way, the battery protection process is always or periodically repeated to prevent the secondary batteries 30 from being in the overcharge state or the overdischarge state.

Figure 7:
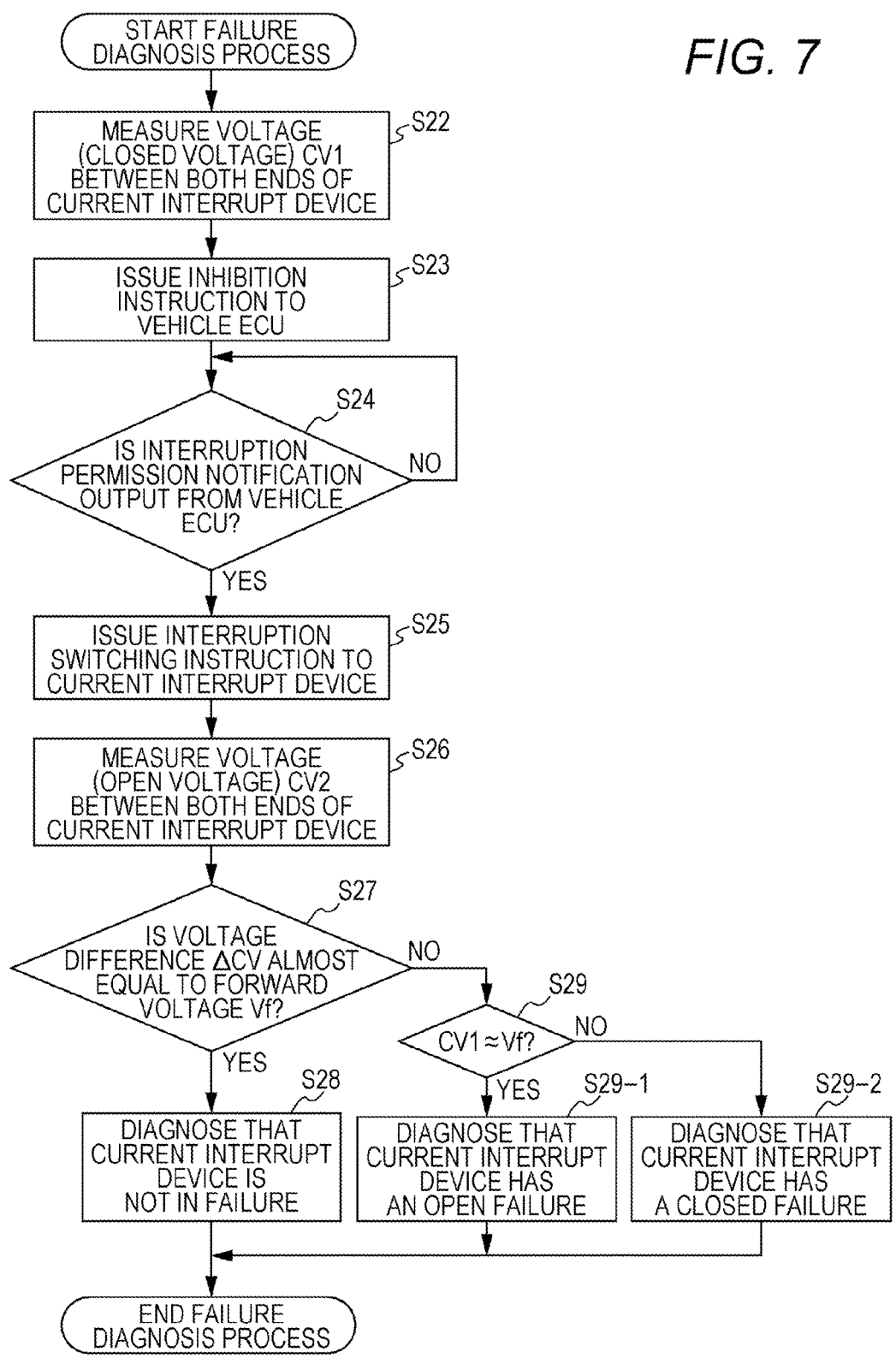
FIG. 7 is a flowchart of a failure diagnosis process.

Next, the failure diagnosis process for the current interrupt device 81 will be described below with reference to FIG. 7.

The failure diagnosis of the current interrupt device 81 is executed when a predetermined time has elapsed from the execution of the last failure diagnosis process and discharge current measured by the current detection unit 67 becomes less than a predetermined value. In other words, the failure diagnosis process for the current interrupt device 81 is executed when there is no movement of the vehicle 10 for a certain period of time and the vehicle 10 reaches a parked state.

Failure of the current interrupt device 81 includes an open failure in which, due to the failure of a drive magnetic coil of the current interrupt device 81 or the like, the current interrupt device 81 remains in an interruption state even if the CPU 61 issues a conduction switching instruction, and a closed failure in which, due to unintended welding of the contact of the current interrupt device 81 or the like, the current interrupt device 81 remains in a conduction state even if the CPU 61 issues an interruption switching instruction.

In the failure diagnosis of the current interrupt device 81, whether the current interrupt device 81 is in failure or not is determined by the CPU 61 by switching the current interrupt device 81 to the conduction state or the interruption state. When it is determined that the current interrupt device 81 is in failure, it is determined whether the failure is an open failure or a closed failure.

In the failure diagnosis process, during when the current interrupt device 81 is brought into the interruption state, current or dark current, which is to be supplied to a low load activated by current less than the maximum allowable current of the diode 82, flows toward the vehicle load 12 from the secondary batteries 30 through the diode 82. However, when the vehicle 10 is started while the current interrupt device 81 is in the interruption state, large current may flow from the secondary batteries 30 to the vehicle load 12 such as a starter motor, for example. In this case, if the large current exceeds the maximum allowable current of the diode 82, that is, if large current flows from the secondary batteries 30 to activate a high load 12A which is activated by a supply of power exceeding the maximum allowable current of the diode 82, the diode 82 might be broken. If a diode having larger maximum allowable current is used, the space for mounting the diode is increased due to an increase in size of the diode, and production cost is also increased.

In view of this, in the failure diagnosis in the present embodiment, the CPU 61 issues an inhibition instruction for inhibiting the high load 12A from being activated to the vehicle ECU 13 before executing the interruption process for switching the current interrupt device 81 to the interruption state from the conduction state.

More specifically, when the failure diagnosis is started, the CPU 61 measures the voltage CV1 between both ends of the current interrupt circuit 80 by the voltage detection circuit 70 (S22).

In this case, the current interrupt device 81 is normally in the conduction state, and therefore, the voltage CV1 between both ends is measured as a closed voltage CV1 for the case in which the current interrupt device 81 is in the conduction state. Note that the processes in S21 and S22 correspond to a "first voltage detection process".

Next, the CPU 61 is going to measure, by the voltage detection circuit 70, an open voltage CV2 for the case in which the current interrupt device 81 in the current interrupt circuit 80 is in the interruption state, and calculate a voltage difference ΔCV between the closed voltage CV1 and the open voltage CV2. In this case, the CPU 61 issues an inhibition instruction to the vehicle ECU 13 through the communication unit 65 so as not to activate the high load 12A before issuing the interruption switching instruction to the current interrupt device 81 (S23). Herein, the inhibition instruction is issued by transmitting a pulse signal (Wake up signal) with a specific width specified in accordance with LIN communication standard.

Then, the CPU 61 starts monitoring whether or not an interruption permission notification is output from the vehicle ECU 13 (S24). When detecting that the interruption permission notification is output from the vehicle ECU 13 (S24: YES), the CPU 61 transmits the interruption switching instruction to the current interrupt device 81 (S25), and measures the open voltage CV2 for the case in which the current interrupt device 81 in the current interrupt circuit 80 is in the interruption state by the voltage detection circuit 70 (S26). Note that the processes in S25 and S26 correspond to a "second voltage detection process".

Then, the CPU 61 calculates an absolute value (|CV1−CV2|) of the difference between the closed voltage CV1 and the open voltage CV2 as the voltage difference ΔCV, and compares the voltage difference ΔCV to the forward voltage Vf stored in the memory 63 (S27).

When the voltage difference ΔCV is substantially equal to the forward voltage Vf as a result of the comparison (S27: YES), it is determined that the current interrupt device 81 is switched to the interruption state from the conduction state and forward current flows through the diode 82 to cause a voltage drop in the forward voltage Vf between both ends of the diode 82. That is, it is determined that the current interrupt device 81 is not in failure (S28), and the failure diagnosis process is ended.

When the voltage difference ΔCV is nearly zero (S27: NO), the voltage CV1 between both ends of the current interrupt circuit 80 and the forward voltage Vf are compared (S29).

When the voltage CV1 between both ends of the current interrupt circuit 80 and the forward voltage Vf are almost the same (S29: YES), it is determined that a voltage drop occurs in the forward voltage Vf between both ends of the diode 82 due to forward current flowing through the diode 82, by which the current interrupt device 81 is diagnosed to have an open failure (S29-1).

On the other hand, when the voltage CV1 between both ends of the current interrupt circuit 80 is nearly zero (when the voltage CV1 between both ends and the forward voltage Vf are not almost the same) (S29: NO), it is determined that current flows through the current interrupt device 81, and thus, the current interrupt device 81 is diagnosed to have a closed failure (S29-2).

Figure 8:
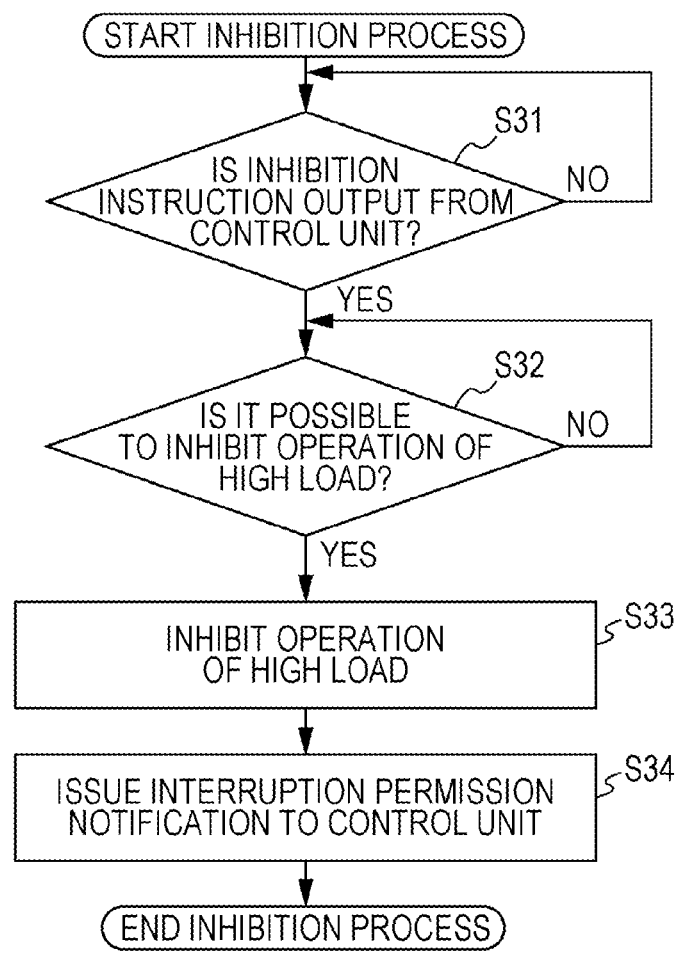
FIG. 8 is a flowchart of an inhibition process.

Next, the inhibition process of the vehicle ECU 13 based on the inhibition instruction output from the CPU 61 will be described with reference to FIG. 8.

The vehicle ECU 13 monitors whether or not the inhibition instruction is output from the control unit 60 in the BMU 50 of the battery apparatus 20 (S31), and when the inhibition instruction is input (S31: YES), the vehicle ECU 13 determines whether or not it is possible to inhibit the operation of the high load 12A out of the vehicle load 12 (S32).

When it is impossible to inhibit the operation of the high load 12A (S32: NO), the vehicle ECU 13 monitors the high load 12A until the vehicle ECU 13 can make determination such that there is no problem in inhibiting the operation of the high load 12A.

On the other hand, when determining that there is no problem in inhibiting the operation of the high load 12A (S32: YES), the vehicle ECU 13 inhibits the high load 12A from being activated during a predetermined period (S33). It is to be noted that the vehicle load 12 other than the high load 12A can be activated, so that the control of the vehicle 10 can be maintained.

When inhibiting the operation of the high load 12A, the vehicle ECU 13 outputs the interruption permission notification to the control unit 60 in the battery apparatus 20 (S34), and then, ends the inhibition process.

According to the present embodiment, the diode 82 is connected in parallel with the current interrupt device 81. In the failure diagnosis process, the voltage difference ΔCV having a magnitude same as that of the forward voltage Vf is caused between the closed voltage CV1 in which the current interrupt device 81 is in the conduction state and the open voltage CV2 in which the current interrupt device 81 is in the interruption state. Thus, the failure diagnosis of the current interrupt device 81 can easily be performed.

Further, in the failure diagnosis process, before the interruption switching instruction is issued to the current interrupt device 81, the inhibition instruction for inhibiting the high load 12A, which is activated by power exceeding the maximum allowable current of the diode 82, from being activated is issued to the vehicle ECU 13. Based on that the interruption permission notification is output by the vehicle ECU 13 (based on that the operation of the high load 12A is inhibited for a predetermined time by the vehicle ECU 13), the interruption switching instruction is issued to the current interrupt device 81. Thus, this configuration can prevent current exceeding the maximum allowable current from flowing through the diode 82.

Specifically, the present embodiment can prevent the diode 82, which facilitates the failure diagnosis by causing a voltage difference on the current interrupt device 81 between the conduction state and the interruption state, from being broken due to large current, while preventing the diode 82 from being large-sized.

According to the present embodiment, the diode 82 which causes an almost constant voltage drop is connected in parallel with the current interrupt device 81. Thus, whether the failure of the current interrupt device 81 is an open failure or a closed failure can easily be diagnosed only by comparing the voltage CV1 between both ends of the current interrupt circuit 80 and the forward voltage Vf.

The present embodiment employs the diode 82 as the voltage drop element connected in parallel with the current interrupt device 81, wherein the diode 82 is disposed such that current flowing through the diode 82 flows in the forward direction which is from the secondary batteries 30 toward the vehicle load 12. Therefore, the present embodiment can prevent the secondary batteries 30 from being overcharged by the vehicle power generator 14, while preventing cutoff of power supply to the vehicle load 12 from the secondary batteries 30 during the control of the vehicle 10.

In the present embodiment, the failure diagnosis process can be executed in about several hundred milliseconds shorter than the starting time for starting the vehicle load 12 such as a starter motor. Thus, the failure diagnosis process can be executed without providing a feeling of strangeness upon the startup of the vehicle 10.

Second Embodiment

Figure 9:
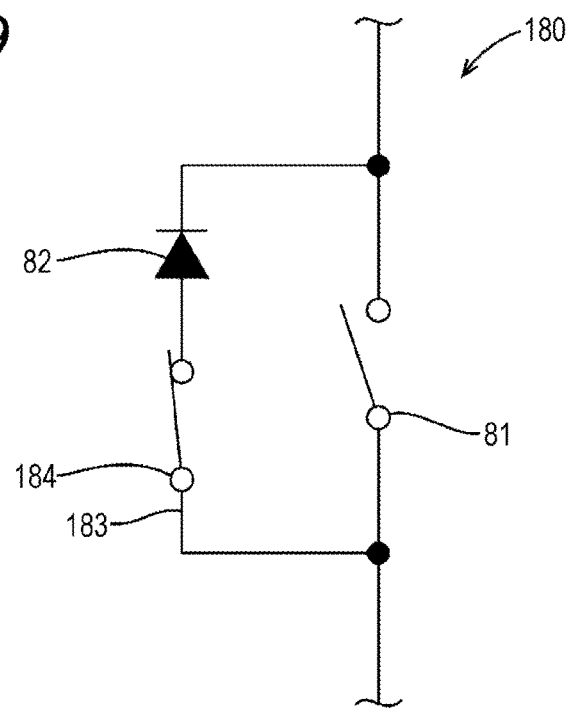
FIG. 9 is a diagram illustrating a current interrupt circuit according to a second embodiment.

Next, a second embodiment will be described with reference to FIGS. 9 to 11.

A current interrupt circuit 180 in the second embodiment is configured by changing the configuration of the parallel circuit 83 in the current interrupt circuit 80 in the first embodiment, and the configuration, operation, and effects same as those in the first embodiment will not be described for avoiding redundant description. In addition, the components same as those in the first embodiment are identified by the same reference numerals.

A parallel circuit 183 in the current interrupt circuit 180 in the second embodiment has not only a diode 82 but also an auxiliary current interrupt device 184 connected in series with the diode 82.

The auxiliary current interrupt device 184 is a contact relay (mechanical switch), for example, and is disposed between the secondary batteries 30 and the diode 82 in such a way that one end thereof is connected to the secondary batteries 30 and the other end thereof is connected to the diode 82. The auxiliary current interrupt device 184 is activated in response to the instruction from a CPU 61 in a BMU 50 so as to cause the secondary batteries 30 and the diode 82 to be in a conduction state or in an interruption state.

Figure 10:
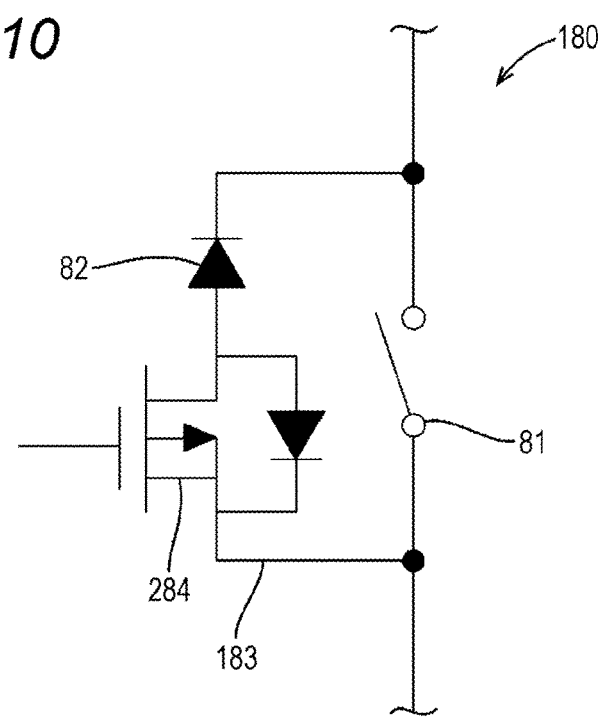
FIG. 10 is a diagram illustrating a modification of an auxiliary current interrupt device.
Figure 11:
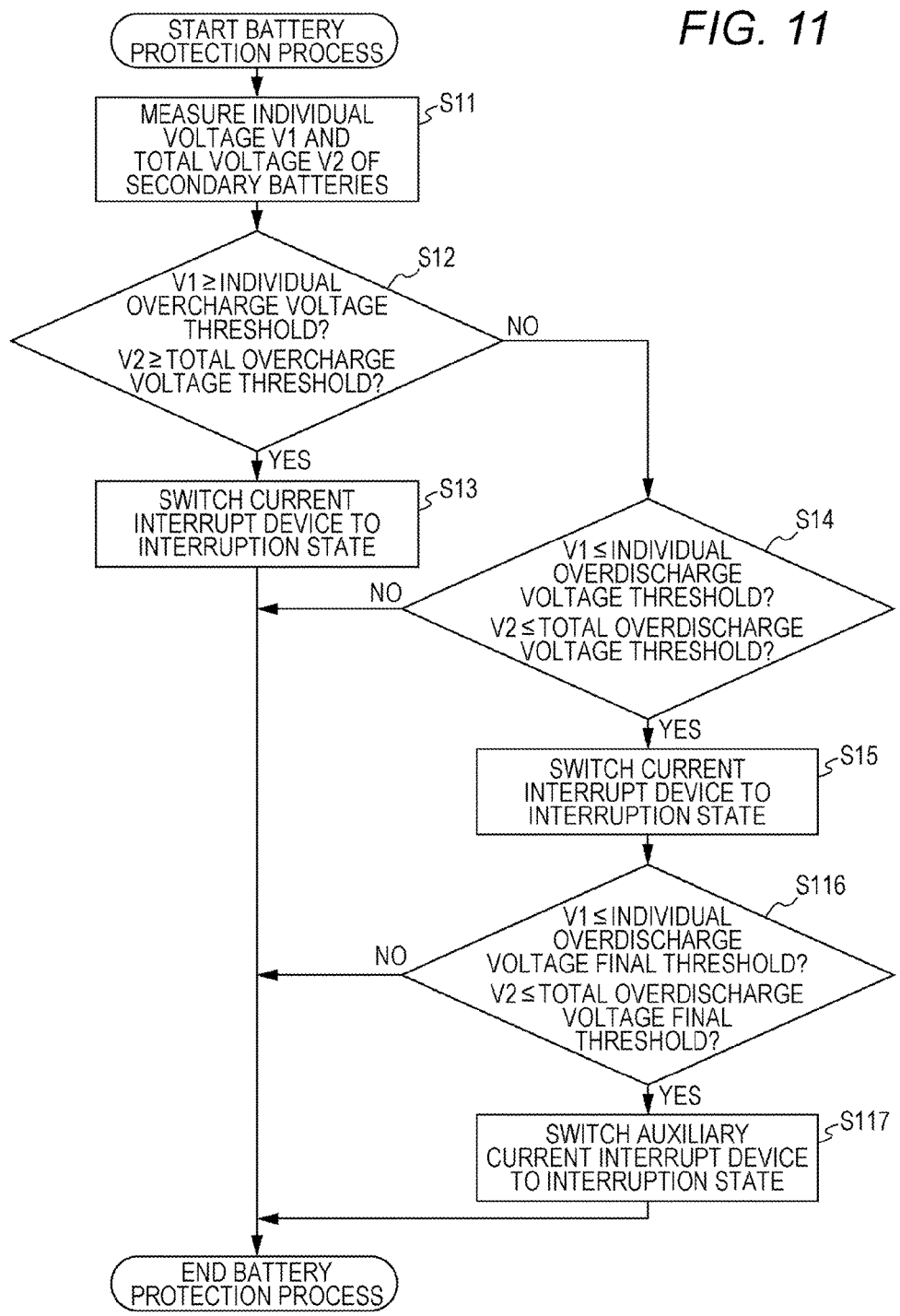
FIG. 11 is a flowchart of a battery protection process.

Although the auxiliary current interrupt device 184 is a contact relay in the present embodiment, an FET switch may be used for an auxiliary current interrupt device 284 as illustrated in FIG. 10. In this case, the FET switch is a P-channel MOSFET, for example, and the FET switch is disposed such that a source is connected to the secondary batteries 30, a gate is connected to the BMU 50, and a drain is connected to the diode 82, respectively.

The battery protection process according to the present embodiment will be described below with reference to FIG. 11.

In the battery protection process in the present embodiment, the processes similar to those in the battery protection process in the first embodiment are performed, and further, additional processes are performed thereafter.

Specifically, in the battery protection process, when determining that the individual voltage V1 of any one of the secondary batteries 30 is smaller than the individual overcharge voltage threshold and the total voltage V2 is equal to or smaller than the total overcharge voltage threshold, as well as the individual voltage V1 of any one of the secondary batteries 30 is equal to or smaller than the individual overdischarge voltage threshold or the total voltage V2 is equal to or smaller than the total overdischarge voltage threshold (S12: NO and S14: YES), the CPU 61 determines that the secondary batteries 30 are likely to reach the overdischarge state. Thus, and the CPU 61 transmits an interruption switching instruction to the current interrupt device 81 to switch the current interrupt device 81 to the interruption state (S15).

After switching the current interrupt device 81 to the interruption state, the CPU 61 further determines whether or not the individual voltage V1 of any one of the secondary batteries 30 is equal to or smaller than an individual overdischarge voltage final threshold, or the total voltage V2 is equal to or smaller than a total overdischarge voltage final threshold (S116).

Herein, the individual overdischarge voltage final threshold assumes a value slightly larger than the voltage value when one of the secondary batteries 30 is in the overdischarge state and slightly smaller than the individual overdischarge voltage threshold, and the total overdischarge voltage final threshold assumes a value slightly larger than the voltage value when the secondary batteries 30 connected in series are in the overdischarge state and slightly smaller than the total overdischarge voltage threshold.

When determining that the individual voltage V1 of any one of the secondary batteries 30 is equal to or smaller than the individual overdischarge voltage final threshold, or that the total voltage V2 is equal to or smaller than the total overdischarge voltage final threshold (S116: YES), the CPU 61 transmits an interruption switching instruction to the auxiliary current interrupt device 184 in the parallel circuit 183 to switch the auxiliary current interrupt device 184 to the interruption state (S117). Thus, current between the secondary batteries 30 and the vehicle power generator 14 is completely interrupted. This can prevent the secondary batteries 30 from reaching an overdischarge state by dark current from the vehicle load 12 (electric component) mounted on the vehicle 10.

In the failure diagnosis process for the current interrupt device 81 in the present embodiment, failure is diagnosed by an operation similar to the operation in the first embodiment. In this case, the failure diagnosis process is performed on the assumption that the auxiliary current interrupt device 184 is normal. This is because the auxiliary current interrupt device 184 is not used for supplying power to the high load 12A, and therefore, has a low probability of being in failure as compared to the current interrupt device 81.

According to the present embodiment, in the case in which the secondary batteries 30 are likely to reach the overdischarge state due to dark current even when the current interrupt device 81 is in the interruption state and discharge is enabled from the parallel circuit 183 through the diode 82, the secondary batteries 30 can reliably be prevented from reaching the overdischarge state by the auxiliary current interrupt device 184.

Third Embodiment

Figure 12:
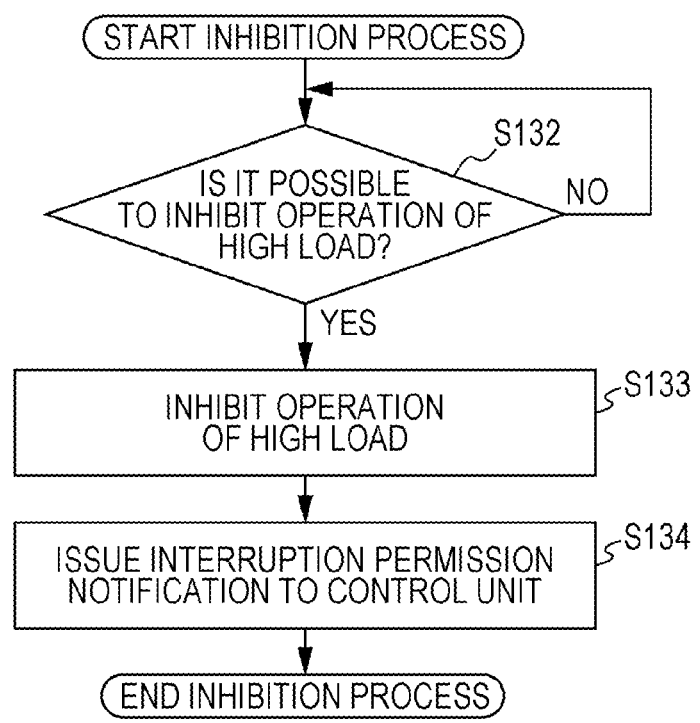
FIG. 12 is a flowchart of an inhibition process according to a third embodiment.

Next, a third embodiment will be described with reference to FIGS. 12 and 13.

In the third embodiment, a BMU 50 executes a failure diagnosis process when a CPU 61 in a control unit 60 in the BMU 50 receives an instruction from the vehicle ECU 13. The configuration, operation, and effects same as those in the first embodiment will not be described for avoiding redundant description. In addition, the components same as those in the first embodiment are identified by the same reference numerals.

Specifically, the vehicle ECU 13 determines the need of the failure diagnosis, and if determining that it is needed, the vehicle ECU 13 executes an inhibition process, and then, the BMU 50 executes the failure diagnosis.

The inhibition process executed when the vehicle ECU 13 determines that the failure diagnosis is needed will be described below with reference to FIG. 12.

The vehicle ECU 13 confirms whether or not the operation of the high load 12A out of the vehicle load 12 can be inhibited (S132). If the operation of the high load 12A cannot be inhibited (S132: NO), the vehicle ECU 13 monitors the high load 12A until the vehicle ECU 13 can make determination such that there is no problem in inhibiting the operation of the high load 12A.

When it can be confirmed that there is no problem in inhibiting the operation of the high load 12A (S132: YES), the vehicle ECU 13 inhibits the high load 12A from being activated during a predetermined period (S133). It is to be noted that the vehicle load 12 other than the high load 12A can be activated, so that the control of the vehicle 10 can be maintained.

When inhibiting the operation of the high load 12A, the vehicle ECU 13 outputs an interruption permission notification to the control unit 60 in the battery apparatus 20 (S134), and then, ends the inhibition process.

Next, the failure diagnosis process by the BMU 50 will be described below with reference to FIG. 13.

Figure 13:
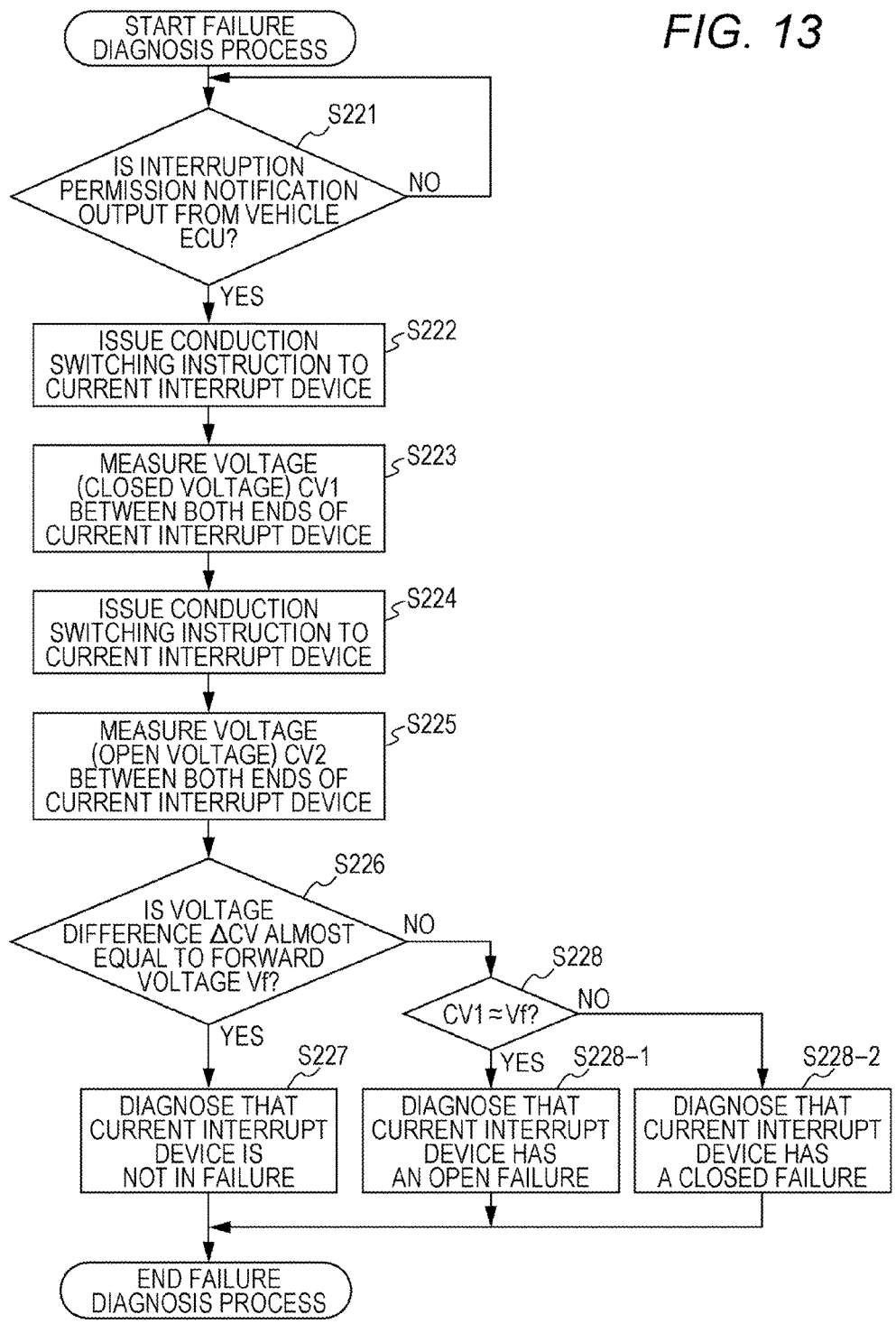
FIG. 13 is a flowchart of a failure diagnosis process.

As illustrated in FIG. 13, in the failure diagnosis process in the third embodiment, the CPU 61 monitors whether or not the interruption permission notification is output from the vehicle ECU 13 (S221), and when detecting that the interruption permission notification is output from the vehicle ECU 13, the CPU 61 transmits to the current interrupt device 81 a conduction switching instruction for switching the current interrupt device 81 to the conduction state (S222), and measures a voltage CV1 between both ends of the current interrupt circuit 80 by the voltage detection circuit 70 (S223). Note that the processes in S222 and S223 correspond to a "first voltage detection process".

Then, the CPU 61 transmits an interruption switching instruction to the current interrupt device 81 (S224), and measures an open voltage CV2 for the case where the current interrupt device 81 is in the interruption state, by means of the voltage detection circuit 70 (S225). Note that the processes in S224 and S225 correspond to a "second voltage detection process".

Then, the CPU 61 calculates an absolute value (|CV1−CV2|) of the difference between the closed voltage CV1 and the open voltage CV2 as the voltage difference ΔCV, and compares the voltage difference ΔCV to the forward voltage Vf stored in the memory 63 (S226).

When the voltage difference ΔCV is almost the same as the forward voltage Vf as a result of the comparison (S226: YES), it is determined that the current interrupt device 81 is switched to the interruption state from the conduction state, and forward current flows through the diode 82 to cause a voltage drop in the forward voltage Vf between both ends of the diode 82. That is, it is determined that the current interrupt device 81 is not in failure (S227), and the failure diagnosis process is ended.

On the other hand, when the voltage difference ΔCV is nearly zero (S226: NO), the voltage CV1 between both ends of the current interrupt circuit 80 and the forward voltage Vf are compared (S228).

When the voltage CV1 between both ends of the current interrupt circuit 80 and the forward voltage Vf are almost the same (S228: YES), it is determined that forward current flows through the diode 82 to cause a voltage drop in the forward voltage Vf between both ends of the diode 82, by which the current interrupt device 81 is diagnosed to have an open failure (S228-1).

On the other hand, when the voltage CV1 between both ends of the current interrupt circuit 80 is nearly zero (S228: NO), it is determined that current flows through the current interrupt device 81 in the current interrupt circuit 80, by which the current interrupt device 81 is diagnosed to have a closed failure (S228-2).

Specifically, in the present embodiment, after the vehicle ECU 13 determines that a failure diagnosis is needed and the inhibition process is executed, the BMU 50 executes the failure diagnosis. Thus, this configuration can prevent the flow of current exceeding the maximum allowable current through the diode 82.

Accordingly, the present embodiment can prevent the diode 82, which facilitates the failure diagnosis by causing a voltage difference on the current interrupt device 81 between the conduction state and the interruption state, from being broken due to large current, while preventing the diode 82 from being large-sized.

Other Embodiments

The technology disclosed in the present specification is not limited to the embodiments described above with reference to the accompanying drawings, and includes various other embodiments described below, for example.

(1) In the embodiments described above, the battery management unit 50 is composed of one CPU 61. However, it is not limited thereto. The battery management unit may include a plurality of CPUs, may be a hard circuit such as an ASIC (Application Specific Integrated Circuit), or may be a microcontroller, a FPGA, a MPU, or a combination thereof.

(2) In the embodiments described above, the diode 82 is used as a voltage drop element. However, the voltage drop element is not limited thereto, and a resistor element may be used for the voltage drop element.

(3) In the embodiments described above, the communication system between the vehicle ECU 13 and the battery apparatus 20 is LIN communication. However, it is not limited thereto. The communication system between the vehicle ECU and the battery device may be CAN communication or other communication system.

(4) In the embodiments described above, the inhibition instruction is output before the current interrupt device 81 is switched to the interruption state in the failure diagnosis process. However, the configuration is not limited thereto. The inhibition instruction may be output before the current interrupt device is switched to the interruption state, regardless of the failure diagnosis.

(5) The embodiments described above are configured such that the CPU 61 outputs the inhibition instruction to the vehicle ECU 13, and when the vehicle ECU 13 outputs the interruption permission notification, the CPU 61 transmits the interruption switching instruction to the current interrupt device 81. However, the configuration is not limited thereto. The CPU may transmit the interruption switching instruction to the current interrupt device in response to the output of the inhibition instruction to the vehicle ECU from the CPU.

(6) The embodiments described above are configured such that the failure diagnosis process for the current interrupt device 81 is executed on the assumption that the auxiliary current interrupt device 184 is normal. However, the configuration is not limited thereto. Besides the current interrupt device, whether the auxiliary current interrupt device is in failure or not may be diagnosed.

(7) The embodiments described above are configured such that the voltage CV1 between both ends of the current interrupt circuit 80 is measured by the voltage detection circuit 70. However, the configuration is not limited thereto. The voltage between both ends of the current interrupt circuit may be indirectly obtained by calculating a difference between voltage of the current interrupt device and the positive-electrode terminal (terminal voltage of the battery apparatus) and voltage of the current interrupt device and the secondary batteries (total value of voltages of the secondary batteries or the total voltage of a plurality of secondary batteries connected in series).

(8) In the above embodiments, a lithium ion battery is taken as one example of an energy storage device. However, it is not limited thereto, and a secondary battery other than lithium ion battery such as a nickel-metal-hydride battery or a lead-acid battery may be employed. Alternatively, an electrochemical cell such as a capacitor associated with electrochemical phenomena may be employed as the energy storage device.

(9) In the above embodiments, a battery apparatus mounted on an automobile is taken as an example. Alternatively, the present invention may be applied for energy storage apparatuses mounted on a two-wheeled vehicle, a railroad vehicle, an uninterruptable power supply (UPS), a regenerative power receiving apparatus, an energy storage apparatus for power generation by natural energy, or the like. A part or the whole functions of the control unit may be located at a distant place, and the control unit may be connected to an energy storage apparatus through a network. Furthermore, the control unit may be implemented on a server in a network.

What is claimed is:

1. A battery apparatus comprising:
    an energy storage device that supplies power to a load;
    a current interrupt device that causes the energy storage device and the load to be in a conduction state or in an interruption state;
    a parallel circuit connected in parallel with the current interrupt device and including:
        a voltage drop element that causes a voltage drop when current flows therethrough; and
        an auxiliary current interrupt device that is connected in series with the voltage drop element and is switched to a conduction state and an interruption state; and
    a control unit,
    wherein the control unit executes an interruption process for switching the current interrupt device to an interruption state, when a high load that is to be activated by supply of power exceeding maximum allowable current of the voltage drop element is not activated.

2. The battery apparatus according to claim 1, further comprising:
    a voltage detection unit that detects a voltage between both ends of the current interrupt device,
    wherein the control unit executes:
        a first voltage detection process for detecting a voltage by switching the current interrupt device to a conduction state;
        a second voltage detection process for detecting a voltage by executing the interruption process; and
        a failure diagnosis process for diagnosing whether or not the current interrupt device is in failure on the basis of the voltage in the first voltage detection process and the voltage in the second voltage detection process.

3. The battery apparatus according to claim 2, wherein the failure diagnosis process is executed in a shorter time than a starting time for starting the high load.

4. The battery apparatus according to claim 1, wherein
    a charger for charging the energy storage device is connected to the energy storage device through the current interrupt device, and
    the voltage drop element is a diode that allows current to flow from the energy storage device to the load.

5. The battery apparatus according to claim 1, wherein the control unit issues an inhibition instruction for inhibiting the high load from being activated during the interruption process to a load system that controls an operation of the load, before executing the interruption process.

6. The battery apparatus according to claim 1, wherein the control unit executes the interruption process in response to an input of an interruption permission instruction for the current interrupt device which is output after a load system controlling an operation of the load inhibits the operation of the high load.

7. A vehicle comprising:
    the battery apparatus according to claim 1;
    the load; and
    a load system that controls an operation of the load.

8. A vehicle comprising:
    the battery apparatus according to claim 5;

the load; and the load system, wherein the load system inhibits the high load from being activated when receiving the inhibition instruction.

9. The vehicle according to claim 8, wherein the control unit executes the interruption process in response to an input of an interruption permission instruction which is output after the load system inhibits the operation of the high load according to the inhibition instruction.

10. A memory that stores a battery management program that causes the control unit in the battery apparatus according to claim 1 to perform:

executing a first interruption process for switching the current interrupt device to an interruption state, when a high load that is to be activated by supply of power exceeding maximum allowable current of the voltage drop element is not activated; and executing a second interruption process for switching the auxiliary current interrupt device to an interruption state.

11. A battery management method for the battery apparatus according to claim 1, the method comprising:

executing a first interruption process for switching the current interrupt device to an interruption state, when a high load that is to be activated by supply of power exceeding maximum allowable current of the voltage drop element is not activated; and executing a second interruption process for switching the auxiliary current interrupt device to an interruption state.

12. The battery apparatus according to claim 1, further comprising:

a current sensor which detects current flowing through the energy storage device.

13. The battery apparatus according to claim 12, further comprising:

a current interrupt circuit including the current interrupt device and the parallel circuit, the energy storage device being connected in series between the current sensor and the current interrupt circuit.

14. The battery apparatus according to claim 13, further comprising:

a positive electrode terminal, the current interrupt circuit being connected to the positive electrode terminal; and a negative electrode terminal, the current sensor being connected to the negative electrode terminal.

15. The battery apparatus according to claim 14, further comprising:

a battery management unit comprising:

the control unit; and a voltage detection circuit voltage which is connected to energy storage device and first and second ends of the current interrupt circuit.

16. The battery apparatus according to claim 15, wherein the voltage detection circuit detects a voltage between the first and second ends of the current interrupt circuit in response to an instruction from the control unit.

17. The battery apparatus according to claim 16, wherein the energy storage device comprises a plurality of energy storage devices which are connected in series, and wherein the control unit comprises:

a central processing unit (CPU) which executes the interruption process;

a memory which stores individual and total overdischarge voltage thresholds of the plurality of energy storage devices, and individual and total overcharge voltage thresholds of the plurality of energy storage devices; and a current detection unit which detects current flowing through the plurality of energy storage devices through the current sensor.

18. The battery apparatus according to claim 17, wherein the interruption process comprises a failure diagnosis process which includes:

diagnosing whether the current interrupt device is in failure; and determining whether the failure is:

an open failure in which the current interrupt device remains in an interruption state after the CPU has issued a conduction switching instruction; or a closed failure in which the current interrupt device remains in a conduction state after the CPU has issued an interruption switching instruction.

19. A battery apparatus comprising:

an energy storage device that supplies power to a load;

a current interrupt device that causes the energy storage device and the load to be in a conduction state or in an interruption state;

a parallel circuit connected in parallel with the current interrupt device and including a voltage drop element that causes a voltage drop when current flows therethrough; and a control unit, wherein the control unit executes an interruption process for switching the current interrupt device to an interruption state, when a high load that is to be activated by supply of power exceeding maximum allowable current of the voltage drop element is not activated, and wherein the control unit issues an inhibition instruction for inhibiting the high load from being activated during the interruption process to a load system that controls an operation of the load, before executing the interruption process.

* * * * *